Patented Aug. 24, 1943

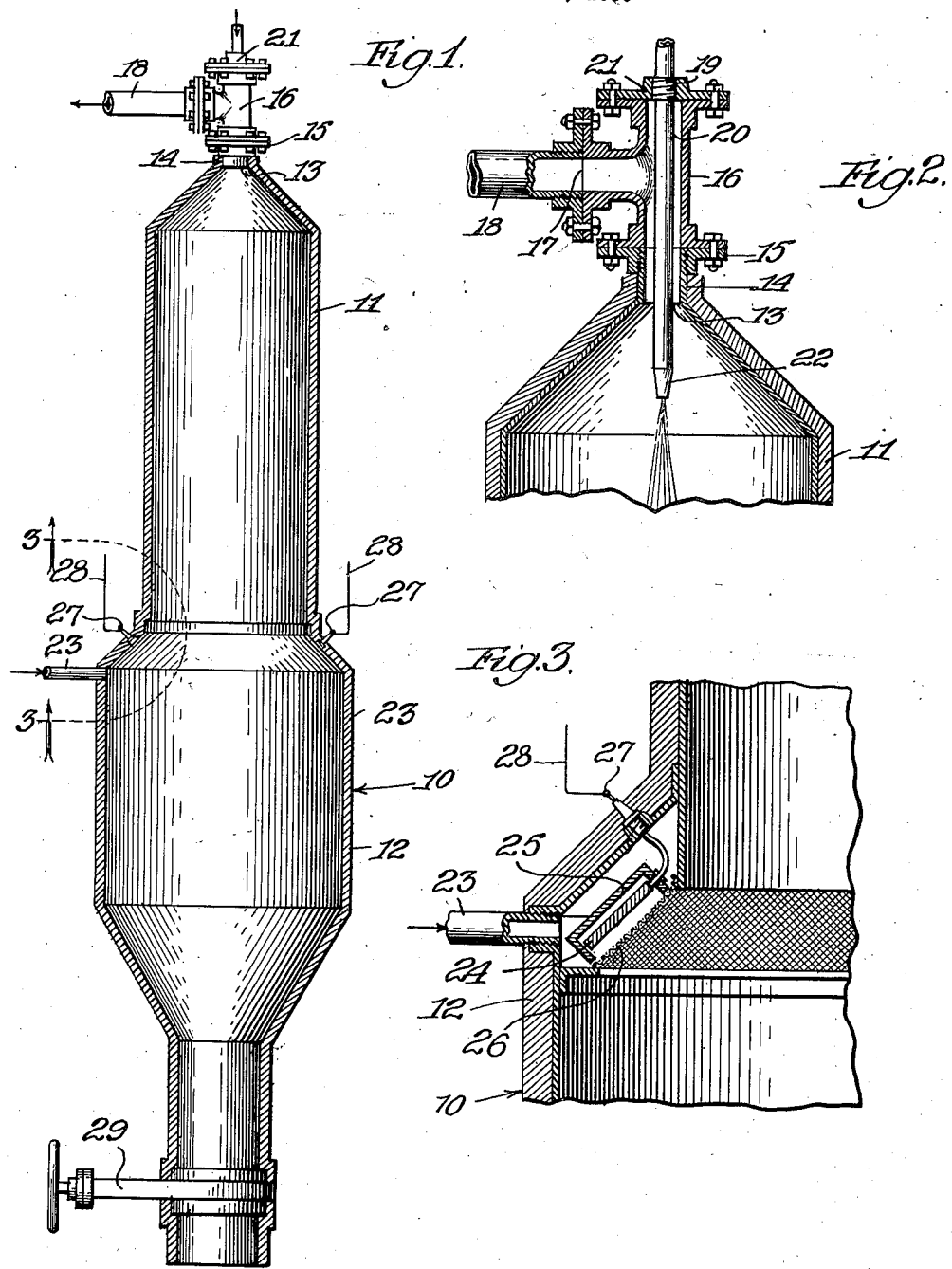

2,327,889

UNITED STATES PATENT OFFICE 2,327,889

APPARATUS FOR EVAPORATING FLUID MATERIALS

Raymond R. Haugh, Chicago, Ill., assignor to Vernon C. Usher, Chicago, Ill.

Application December 16, 1939, Serial No. 309,690

1 Claim. (Cl. 159—4)

This invention relates to a method and apparatus for evaporating fluid materials and more particularly to the drying of milk, eggs, and other food products.

One object of this invention is to provide for rapid evaporation of liquids at relatively low temperatures. Another object is to provide a vacuum drying operation in which foaming of the liquid is avoided. Still another object is to obtain rapid drying of liquids while at the same time avoiding the burning and charring caused by local heating. Another object is to provide for the drying of eggs at a temperature which will not cause coagulation of the same. Yet another object is to provide for the drying of milk at a reduced pressure without affecting the flavor of the milk. A further object is to provide for the drying of yeast without the destruction of any substantial portion of the cells thereof. Still a further object is to provide means for treating fluids with superheated steam. Other features and advantages will be apparent from the following specification and drawing, in which—

Figure 1 is a side elevational view of apparatus embodying my invention, with the covering insulation therefor shown in section; Figure 2 is a detail fragmentary sectional view of the upper portion of the apparatus; and Figure 3 is a detail sectional view of the portion of the apparatus indicated by the lines 3—3 of Figure 1.

Although my apparatus may be used for any purpose in which it is desired to obtain the rapid drying of a liquid while maintaining the same at a low temperature, it is particularly adapted for the drying of milk, eggs, yeast, and similar products.

Since my apparatus is adapted for drying in vacuum at low temperature, it may also be used for the drying of fruit juices, vegetables, vegetable juices, bacterial cultures or other products where the live organism is to be retained in the finished product. The materials to be dried are preferably in the fluid form and may be sprayed into the apparatus. During the evaporation in vacuum, the solids which are produced are expanded into porous particles, in which condition they are easily and readily re-constituted to their original condition when treated with a suitable amount of water.

Before the drying operation is completed, the materials may be combined with a viscous liquid such as glucose or malt syrup or the like. The addition of these substances aids in the expansion of the product being dried, which, in turn, results in the product being more readily re-constituted.

The apparatus is also suitable in the drying of pumpkin flour, carrot flour, banana flour, all vegetable and cereal flours, fruit flours, meat flours, meat juices, and combinations of these substances with other materials such as sugar, salt, and the like. Milk and cream, however, are particularly adapted for use with this apparatus. If the milk or cream is combined with glucose or syrup, the keeping qualities of the resultant product are greatly enhanced, and, in addition, the product may be dissolved or re-constituted much more readily than products of this type which have heretofore been made.

It is likely that the ready solubility and the ability to be easily re-constituted are due to several factors. The use of a low temperature and high vacuum tend to prevent any substantial changes in the material. The prevention of local heating effects, as is possible with my apparatus, is also helpful. Even more important is the fact that in drying a liquid a highly viscous or plastic mass is formed as the drying progresses. When the material is in such condition, the further evaporation or drying causes the formation of bubbles of vapor within the material and this in turn produces expansion within the material. Because the material is already in the form of a plastic mass, substantially no foaming will result. Nevertheless, as the drying nears completion, the bubbles of vapor formed in the material produce small interstitial air spaces therein and result in a highly soluble product. The addition of glucose or malt syrup to the mixture not only serves to aid in preserving the product, but also helps in the formation of the plastic mass.

In the drying of milk by ordinary methods, care must be taken of burning or charring the milk as a result of the milk coming in contact with heated metal surfaces or due local heating effects. In other words, when the container is heated to a temperature in excess of the temperature of the milk, the milk immediately adjacent the walls of the container may be burned. To a certain extent this may be avoided by operating the apparatus under a reduced pressure and at a lower temperature. However, the use of vacuum in the evaporation of a quantity of liquid usually means that considerable difficulty will be encountered because of the foaming and effervescence of the liquid. By means of my invention I have succeeded in quickly raising the temperature of the milk without encountering difficulty from burning or foaming.

In the specific embodiment of my invention described herein, a container 10 of any suitable size and shape provides a mixing chamber 11 and has in addition an enlarged lower portion 12 adapted to receive material after treatment. The outer surface of the container 10 is preferably provided with insulation 23.

The container 10 is equipped with an aperture 13 which communicates with the upper end of the container. An upper extension 14 of the container 10 may threadedly engage the mounting 15 to which is secured the T-shaped pipe 16 communicating with the aperture 13. The pipe 16 has at one end an opening 17, at which point the pipe may be connected to a conduit or pipe 18 which leads to any suitable source of vacuum (not shown). If desired, the conduit 18 may be of flexible material. The other end 19 of the pipe 16 is so arranged as to permit a fluid inlet pipe 20 to pass therethrough. A closure member 21, engaging the fluid inlet pipe 20 and the end of the pipe 16, provides an air-tight seal around the inlet pipe.

The inlet pipe 20 is preferably equipped with a nozzle 22 providing a small orifice through which liquids or fluids may be sprayed. In order to obtain a dispersement of the fluid into small particles when passing through the nozzle 22, the fluid is preferably placed under pressure in the inlet pipe 20.

Spaced away from the aperture 13 and the inlet pipe 20 is an inlet 23 adapted to permit the flow into the container of superheated steam. If desired, an electrical heating element 24 may be mounted on a support 25 behind a filter or screen 26 and connected to a source of electrical energy by the wires 27 and 28. In the lower portion of the container a gate valve 29 of any suitable construction may be used to remove material from the container.

In operation, the fluid to be evaporated or dried is passed into the container 10 through the inlet pipe 20, being sprayed from the nozzle 22. At the same time the inlet pipe 23 at the base of the mixing chamber 11 furnishes a constant flow of superheated steam or other heating medium. When steam is used it is usually preferred that it be heated to a temperature between 350° and 400° F. However, if the operation is carried out at a reduced pressure, for example, one-half atmosphere, steam superheated to only 175°–200° F. may be used.

The container is subjected to evacuation through the conduit 18 and aperture 13. In this manner the container is under a reduced pressure when the gaseous heating medium and the fluid are mixed. I prefer to operate the system under a pressure of approximately one-half atmosphere.

By spacing the inlet 23 away from the pipe 20 as described, the fluid spray and the superheated steam or gaseous heating medium are caused to flow in opposite directions. The superheated steam is drawn from the inlet 23 across the mixing chamber 11 and out through the aperture 13 and conduit 18. As the steam travels along this path, it meets a fine spray of fluid flowing downwardly from the nozzle 22.

By using a large excess of superheated steam it is possible to readily heat and evaporate the fluid to dryness. The steam does not condense in any substantial quantities, but is merely desuperheated, or in other words, reduced in temperature to the boiling point of water at the particular pressure under which the system is being operated. In the event that any of the steam is condensed as a result of its contact with the fluid spray, it is again quickly vaporized by the inflow of additional superheated steam.

Foaming and effervesence is normally caused by the formation of large bubbles of vapor in a relatively large body of liquid and particularly if the liquid has a high viscosity. In my process, since the steam is brought into contact with the liquid while the liquid is dispersed in the form of finely divided particles, this disadvantage is eliminated.

The conditions of time, temperature and pressure will, of course, vary somewhat with the different materials which may be evaporated or dried. In the drying of yeast and eggs, for example, I prefer to use a much lower temperature and pressure than for the treatment of milk.

As previously stated, the materials to be dried, such as milk and eggs, may, if desired, be mixed with other substances such as flour and glucose or syrup before treatment. On the other hand, all of these materials, including yeast, if this is to be dried, should be in a fluid condition in order that the apparatus described herein may be used. However, if they are not in fluid condition, it means only that they cannot be sprayed into the mixing chamber.

While there are shown and described certain embodiments of the invention, it is to be understood that it is capable of many modifications. Changes, therefore, in the construction and arrangement may be made without departing from the spirit and scope of the invention as disclosed in the appended claim, in which it is intended to claim all novelty inherent in the invention as broadly as permissible, in view of the prior art.

I claim:

Apparatus of the character described for the evaporation of fluids, which comprises a container, an outlet conduit at the upper end of said container, an inlet pipe positioned within said outlet conduit, said inlet pipe being provided with a small orifice adapted to produce a fluid spray, another inlet in said container, said second inlet being spaced away from said first-mentioned inlet and being adapted to permit the introduction of superheated steam into the container, a screen within said container extending about said second inlet and forming a chamber thereabout, heater means in said container for heating the steam introduced through said second inlet, an outlet in the lower portion of the container for removing solids or liquids therefrom, and means connected with said outlet conduit for evacuating said container whereby the superheated steam introduced through said second inlet passes upwardly through the container to said outlet conduit.

RAYMOND R. HAUGH.